US011405318B2

(12) United States Patent
Wong

(10) Patent No.: US 11,405,318 B2
(45) Date of Patent: Aug. 2, 2022

(54) COLLABORATIVE TRAFFIC BALANCER

(71) Applicant: Cisco Technology, Inc., San Jose, CA (US)

(72) Inventor: Chunhui Wong, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/089,530

(22) Filed: Nov. 4, 2020

(65) Prior Publication Data

US 2022/0141139 A1 May 5, 2022

(51) Int. Cl.
*H04L 47/125* (2022.01)
*H04L 41/5003* (2022.01)
*H04L 9/40* (2022.01)
*H04L 47/70* (2022.01)

(52) U.S. Cl.
CPC ........ *H04L 47/125* (2013.01); *H04L 41/5003* (2013.01); *H04L 47/825* (2013.01); *H04L 63/20* (2013.01)

(58) Field of Classification Search
CPC .................................................... H04L 47/125
See application file for complete search history.

(56) References Cited

U.S. PATENT DOCUMENTS

| | | | |
|---|---|---|---|
| 2014/0258523 A1* | 9/2014 | Kazerani | H04L 43/12 709/224 |
| 2014/0280878 A1* | 9/2014 | Hardin | H04L 41/145 709/224 |
| 2015/0215388 A1 | 7/2015 | Kontothanassis et al. | |
| 2015/0319050 A1 | 11/2015 | Kasturi et al. | |
| 2017/0279722 A1 | 9/2017 | Amulothu et al. | |
| 2018/0062875 A1 | 3/2018 | Tumuluru | |

* cited by examiner

*Primary Examiner* — Adnan M Mirza
(74) *Attorney, Agent, or Firm* — Lee & Hayes, P.C.

(57) ABSTRACT

This disclosure describes techniques for employing a collaborate traffic balancer in communications among network devices. The techniques include dynamic traffic engineering concepts to improve network communications. The techniques may include causing a headend device to establish a secure communication session between a client device and a server in a resource infrastructure supporting the service. The techniques may include selecting a tunnel for the secure communication session to reach the resource infrastructure. The techniques may further include migrating the secure communication session from a current tunnel to a new tunnel where a degradation in quality of the secure communication session is predicted.

20 Claims, 8 Drawing Sheets

COLLABORATIVE TRAFFIC BALANCER

TECHNICAL FIELD

The present disclosure relates generally to load-balancing of application traffic in multi-cloud environments, thereby improving performance of cloud data centers.

BACKGROUND

Applications may be offered to end users via cloud computing platforms. Some providers may offer an application and/or service via a multi-cloud and/or hybrid cloud environment. In such environments, anycast addressing may be used for application traffic routing. Further, the routing of application traffic in a multi-cloud and/or hybrid cloud environment may be accomplished with software-defined wide area network (SDWAN) tunneling. Traditionally, the routing of application traffic via security tunnels over WAN to the services hosted in the cloud may have been based on quality of service (QoS) and/or service level agreement (SLA) policies of an SDWAN network management system. As such, rerouting of application traffic may have been reactive to issues arising from QoS and/or SLA policies. For instance, where an SLA criteria was violated, switchover to a new route may have occurred reactively. With the increasing mobility of end users and hosting of applications in multi-cloud and/or hybrid cloud type-environments, it may be advantageous to further optimize the routing of application traffic.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1A:
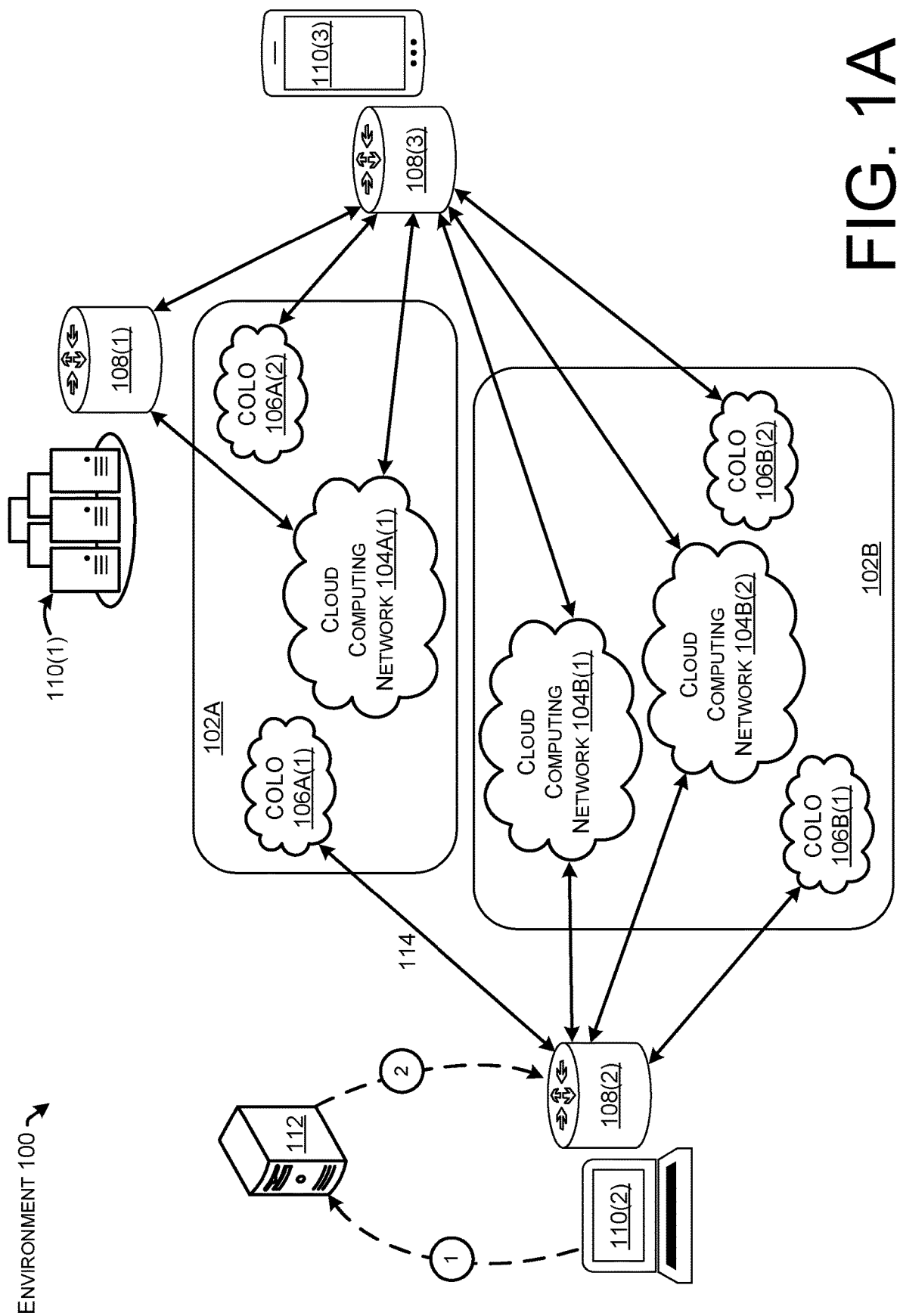
FIGS. 1A-1C illustrate component diagrams with example environment in which a collaborative traffic balancer may be employed in relation to communications between network devices, in accordance with the present concepts.

This disclosure describes, at least in part, a method that may be implemented by a controller device communicatively coupled to a headend device and a backend device. The method may include receiving, receiving a request to establish a secure communication session between a client device and a service. The method may include causing the headend device to establish the secure communication session between the client device and a first server in a first resource infrastructure supporting the service. The method may also include receiving first telemetry data from the headend device indicating a first performance of the secure communication session, and/or receiving second telemetry data from the backend device associated with the first resource infrastructure indicating a second performance of the first resource infrastructure supporting the service. The method may include determining that at least one of the first performance or the second performance is within a threshold amount from violating a quality of service (QoS) policy. In response to determining that at least one of the first performance or the second performance is within the threshold amount from violating the QoS policy, the method may include causing the headend device to migrate the secure communication session between the client device and the service from the first server in the first resource infrastructure to a second server in a second resource infrastructure that supports the service.

This disclosure also describes, at least in part, a method that may be implemented by a controller device communicatively coupled to a headend device and a backend device. The method may include receiving, at the controller device and from the headend device, a request to establish a secure communication session between a client device and a service. The method may include causing the headend device to establish the secure communication session between the client device and a first server in a first resource infrastructure supporting the service. The method may also include receiving telemetry data from the backend device associated with the first resource infrastructure indicating a performance of the first resource infrastructure supporting the service. The method may further include determining that the performance is within a threshold amount from violating a quality of service (QoS) policy. Also, the method may include causing the headend device to migrate the secure communication session between the client device and the service from the first server in the first resource infrastructure to a second server in a second resource infrastructure that supports the service.

This disclosure also describes, at least in part, a method that may be implemented by a controller device communicatively coupled to a headend device and a backend device. The method may include receiving a request to establish a secure communication session between a client device and a service. The method may also include causing the headend device to establish the secure communication session between the client device and a first server in a first resource infrastructure supporting the service. The method may include receiving first telemetry data from the headend device indicating a first performance of the secure communication session, and/or receiving second telemetry data from the backend device associated with the first resource infrastructure indicating a second performance of the first resource infrastructure supporting the service. Further, the method may include determining that at least one of the first performance or the second performance is predicted to degrade below a threshold performance level at an upcoming time. In response to determining that at least one of the first performance or the second performance is predicted to degrade below the threshold performance level, the method may include causing the headend device to migrate the secure communication session between the client device and the service from the first server in the first resource infrastructure to a second server in a second resource infrastructure that supports the service.

Additionally, the techniques described herein may be performed by a system and/or device having non-transitory computer-readable media storing computer-executable instructions that, when executed by one or more processors, performs the methods described above.

Example Embodiments

This disclosure describes techniques for dynamic traffic engineering to better optimize services offered via anycast in multi-cloud and/or hybrid cloud environments. In some examples, the dynamic traffic engineering may be performed by a traffic balancer that balances application traffic over various traffic paths. The traffic balancer may be capable of automatically improving optimization of the application traffic. The traffic balancer may be collaborative, able to consider many criteria while attempting to optimize the application traffic. Furthermore, the traffic balancer may be predictive, able to route application traffic to avoid a potential future bottleneck. Therefore, the disclosed techniques may offer smoother flow of application traffic, with less disruption to a service.

In some examples, a secure communication session may be offered from a multi-cloud and/or hybrid cloud environment (e.g., resource infrastructure) to a user endpoint (e.g., client device). The secure communication session may be associated with a service provided via the cloud environment, such as Software as a Service (SaaS), for example. Application traffic may travel via anycast addressing over wide area network (WAN) tunnels from any given user endpoint to the service in the cloud. For instance, the tunnels may be software-defined WAN (SDWAN) tunnels. A user endpoint may be manifested as any one of a variety of computing devices, such as a computer at a residence or office, a mobile device such as a cell phone, etc. In multi-cloud and/or hybrid cloud environment(s), the service may be offered through a variety of cloud data center(s), Colocation (COLO) site(s), etc. Therefore, several SDWAN tunnels may be available for the application traffic to travel between the user endpoint and the service.

Traditionally, application traffic may have been routed to services hosted in a regional data center of a cloud provider via WAN security tunnels based on Quality of Service (QoS) and/or Service Level Agreement (SLA) policies. The policies may have been managed by a SDWAN network management system (NMS), for instance. Traffic may have been routed via the tunnels based only on information available regarding the networking side, while information regarding conditions on the cloud side (e.g., backend services side) may have been undiscoverable, or hidden within the cloud, and therefore not included in traffic routing decisions. In cases where a selected tunnel was over-provisioned, SLA criteria may have been violated. The application traffic may be been rerouted reactively, in response to the violation. However, application traffic flow disruption and/or service disruption may have occurred before the rerouting was able to resolve the application traffic flow issue. Thus, reactive traffic engineering may be unable to prevent future flow and/or service disruptions.

For improved traffic engineering, a collaborative traffic balancer may be capable of proactively determining routing for any given instance of application traffic, and possibly avoiding future service disruptions. In some implementations, dynamic traffic engineering techniques may include considering the networking side of the traffic routing dilemma, in other words the paths available to any given user endpoint. The collaborative traffic balancer may be capable of learning likely traffic patterns over available internet protocol (IP) security (IPSec) tunnels, for instance. Additionally, in some implementations, dynamic traffic engineering techniques may include considering the cloud side of application traffic. For instance, the collaborative traffic balancer may be able to learn about traffic patterns and/or traffic loads at different regions of a multi-cloud environment, and select a route to a region that has a lower current load or lower expected load in the future. The collaborative traffic balancer may learn traffic patterns via crowd-sourcing and/or peer comparison, for instance. Thus, the collaborative traffic balancer may have insight into better optimized routes based on both the networking side and the cloud side of application traffic.

The collaborative traffic balancer may also take into account a type or nature of the application. For instance, the collaborative traffic balancer may consider likely application traffic amounts and/or patterns that are typically observed with a given service. The collaborative traffic balancer may also consider any application SLA, thereby building a robust expectation of application traffic that will help an application run smoothly and within operating expectations.

In some implementations, the collaborative traffic balancer may also consider a combination of capability and stability. For example, the collaborative traffic balancer may know the specifications of a tunnel, such capacity, bandwidth, speed, etc. The collaborative traffic balancer may also learn how stable the tunnel has been in the past. The collaborative traffic balancer may then be able to discover and/or estimate how stable the tunnel is likely to be in the future. A combination of information including capability and stability may allow the collaborative traffic balancer to make better informed traffic routing decisions moving forward.

With predicted traffic patterns over available WAN tunnels, insight into service-side load activity, and application operating expectations learned, the collaborative traffic balancer may be able to predict potential future service disruptions. The collaborative traffic balancer may be able to select routes that avoid potential future service disruptions. The collaborative traffic balancer may attempt to optimize route selection to better balance loads across a multi-cloud and/or hybrid cloud environment. The collaborative traffic balancer may also attempt to optimize route selection dynamically, as conditions change over time and/or as new information about the available routes and/or applications becomes available. Furthermore, in some examples, the collaborative traffic balancer may predict unavoidable issues, such as a brownout, where no proper tunnels for a user endpoint to access the service will be able to satisfy application operating expectations, such as an application-specific SLA. In such examples, the collaborative traffic balancer may raise a proactive warning of a likely degradation of the application. The collaborative traffic balancer may be able to provide a suggestion that a client could attempt direct access as a better option, for instance.

In some implementations, the disclosed techniques may be appropriate solutions for balancing loads of application traffic relative to services in a diverse range of use-case scenarios, including enterprise, environments using small median business (SMB) communications protocol, small office or home office (SOHO), COLO, multi-cloud, hybrid cloud, and/or other types of data center environments. In some examples of the collaborative traffic balancer, associated application traffic may be routed over WAN via secure tunnels as anycast overlay, as opposed to building underlay secure WAN tunnels based on anycast. In some cases, the collaborative traffic balancer may be described as balancing loads of application traffic over SDWAN IPSec tunnels with both network and multi-cloud SLA services satisfied, but without overloading traffic over qualified tunnels, while allowing paths to more capable, higher performing tunnels and backend service endpoints to share the load.

With the advent of increasing mobility, sharing, and applications hosted in cloud data centers, there is increasing demand for dynamic traffic engineering so that application and service traffic flow more smoothly, with less disruptions. Simultaneously, traffic engineering should still strive to satisfy the nature of each application, and provide high availability globally. The present concepts include a simple-to-implement solution to work toward optimizing services delivered via anycast with an automatic, collaborative traffic balancer. The collaborative traffic balancer strives to optimize application traffic paths over various security tunnels with community-aware services to meet application SLAs and thus lower operation expenditure and improving overall network operations.

Although the examples described herein may refer to a collaborative traffic balancer and/or a controller (e.g., controller device) as the point of generation of dynamic traffic engineering concepts, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
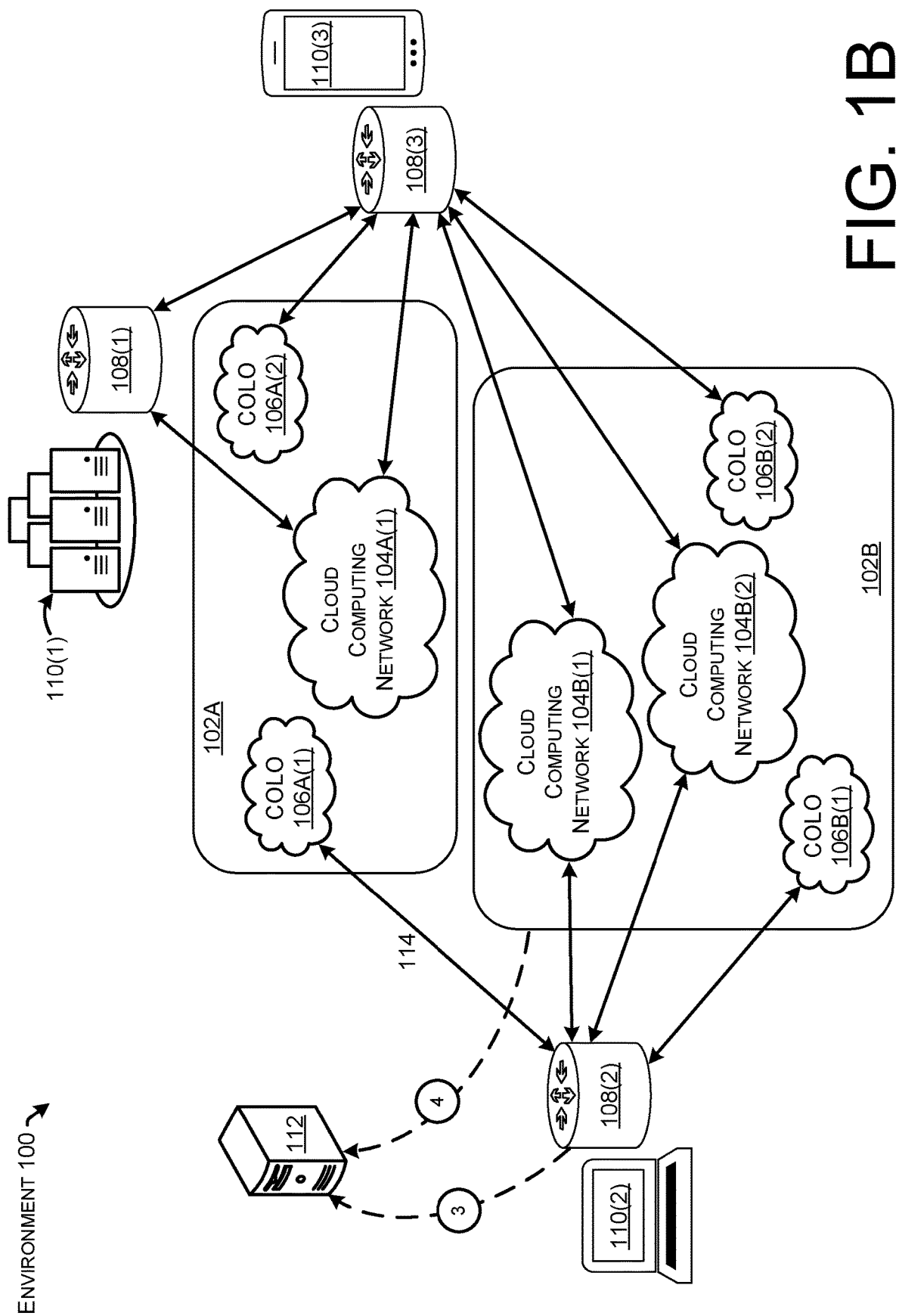
Figure 1C:
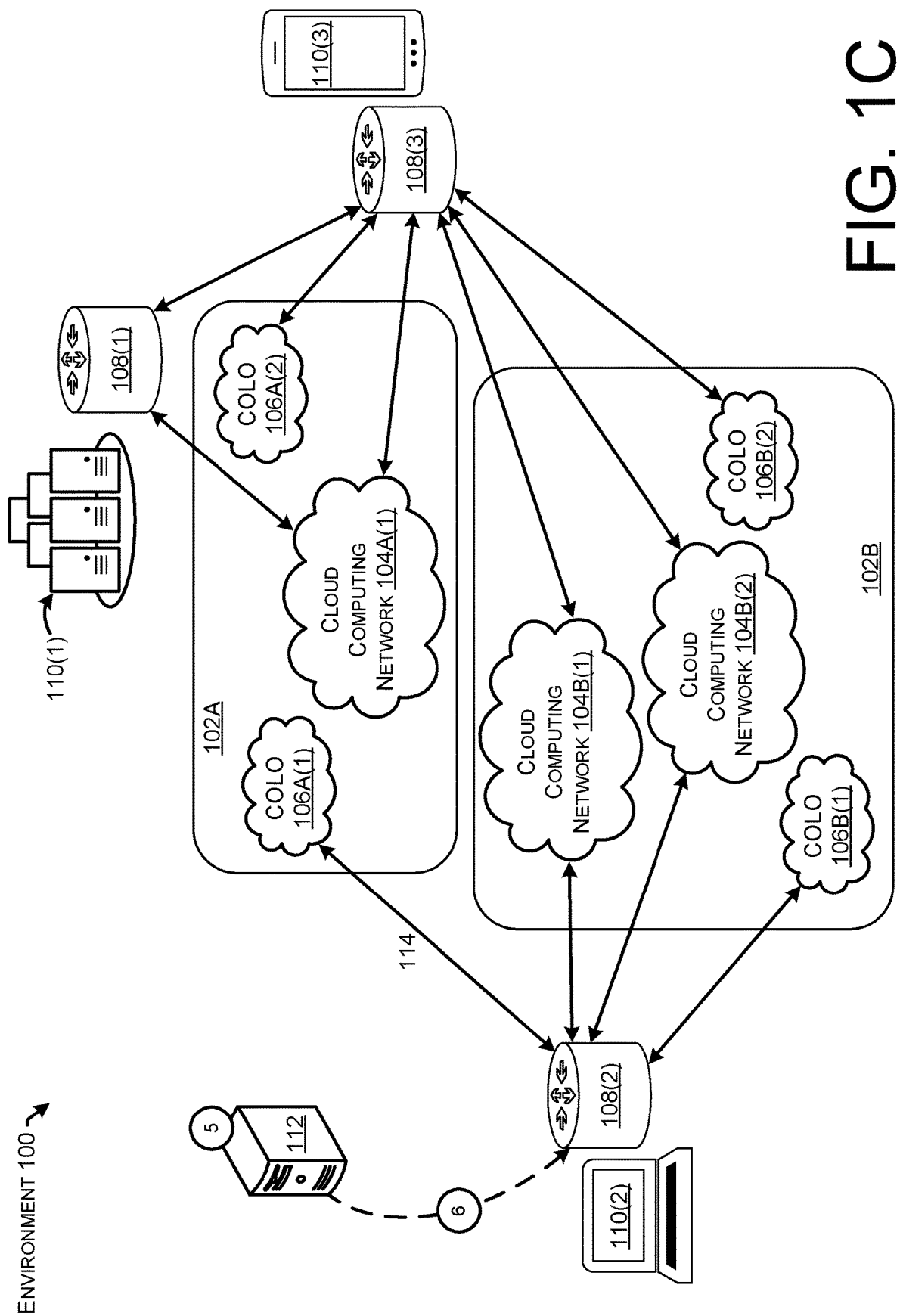

FIGS. 1A-1C collectively illustrate an example environment 100 in accordance with the present dynamic traffic engineering concepts. Example environment 100 may include one or more multi-cloud environments 102. A multi-cloud (and/or hybrid cloud) environment 102 may include one or more cloud computing networks 104 (e.g., networks) and/or one or more colocation sites (COLOs) 106. Example environment 100 may also include one or more routers 108 (e.g., headend devices), one or more client devices 110, and one or more controller devices 112. In some cases, parentheticals are utilized after a reference number to distinguish like elements. Use of the reference number without the associated parenthetical is generic to the element. For instance, three routers 108 are depicted in FIGS. 1A-1C, including router 108(1), router 108(2), and router 108(3).

In some implementations, a multi-cloud environment 102 may be associated with a service, such as a Software as a Service (SaaS). In example environment 100, multi-cloud environment 102A may be viewed as being associated with a service "A," while multi-cloud environment 102B may be viewed as being associated with a service "B." In accordance, cloud computing network 104A(1), COLO 106A(1), and COLO 106A(2) may be viewed as being associated with service A, while cloud computing network 104B(1), cloud computing network 104B(2), COLO 106B(1), and COLO 106B(2) may be viewed as being associated with service B. In some examples, any of cloud computing networks 104 and/or COLOs 106 may represent a resource infrastructure. For instance, a resource infrastructure represented by cloud computing network 104A(1) may include a variety of networked devices (e.g., backend devices), such as servers, switches, routers, hubs, bridges, gateways, modems, repeaters, access points, hosts, etc. Furthermore, different cloud computing networks 104 and/or COLOs 106 within a multi-cloud environment 102 may be associated with different regions, in some examples. For instance, cloud computing network 104B(1) may correspond to a first region, while cloud computing network 104B(2) corresponds to a second region. The different regions may be geographic regions, for example. In general, cloud computing networks 104 and/or COLOs 106 may or may not exhibit a differentiating feature (s), such as a geographic region.

Service A and/or service B may be provided via the respective multi-cloud environment 102 to a client device 110. For instance, data traffic (e.g., application traffic) associated with service A may be routed from COLO 106A(1) in multi-cloud environment 102A, through router 108(2) (e.g., access point), to client device 110(2) (e.g., user endpoint). Similarly, router 108(1) may function as an access point for client device 110(1), and router 108(3) may function as an access point for client device 110(3). A client device 110 may be manifested as any one of a variety of computing devices, such as a computer at a residence or office, a mobile device such as a cell phone, etc. As used herein, a client device 110 may also represent multiple devices, such as a bank of servers represented by client device 110(1). The data traffic associated with a service (e.g., application traffic) may include a communication session, such as a secure communication session. In some implementations, data traffic may travel via tunnels 114 from any given client device 110 to the service in the cloud. For instance, the tunnels 114 may be wide area network (WAN) tunnels. Furthermore, the tunnels 114 may be software-defined WAN (SDWAN) tunnels. In FIGS. 1A-1C, several example tunnels 114 are represented with double arrows. Only one tunnel 114 is labeled to avoid clutter on the drawing page. Multiple tunnels 114 may be available for the application traffic to travel between any given client device 110 and a service. For example, as shown in FIGS. 1A-1C, client device 110(2) may access service B via tunnels 114 from router 108(2) to cloud computing network 104B(1), from router 108(2) to cloud computing network 104B(2), and/or from router 108(2) to COLO 106B(1).

In some implementations, the routers 108 may be viewed as "headend" devices relative to application traffic passing between client devices 110 and multi-cloud environments 102. Also, devices within the multi-cloud environments 102 may be viewed as "backend" devices relative to application traffic. For instance, client device 110(2) may pass application traffic to service B via a headend device, router 108(2), through a tunnel 114, to a backend device within cloud computing network 104B(1).

In additional to the tunnels 114 described above, the devices of environment 100 may be otherwise communicatively coupled to one another in a networked manner. Within the example environment 100, the illustrated devices and/or components of the resource infrastructures represented by the multi-cloud environments 102 may exchange communications (e.g., packets) via transport control protocol (TCP) network connections or any of a variety of types of network connection (e.g., information-centric networking (ICN)) and/or network paths, for instance. Aside from tunnels 114, additional network connections are not shown to avoid clutter on the drawing page. In some instances, network connections may be used for communication via a data plane and/or a control plane. For example, controller device 112 may be communicatively coupled to routers 108 and/or various other devices in environment 100. Also, client devices 110 may be communicatively coupled to routers 108 and/or various other devices in environment 100. For instance, data traffic may be sent by a network connection from client device 110(2) to router 108(2) before continuing on to service B in multi-cloud environment 102B.

FIGS. 1A-1C show several examples of communications between controller device 112 and various other devices in environment 100. The communications are indicated with dashed, numbered lines, and may be sent via the network connections described above. It should be appreciated that various example Steps are described relative to FIGS. 1A-1C for the purpose of illustrating dynamic traffic engineering concepts. More or fewer Steps might be performed than shown in the FIGS. 1A-1C and described herein. The Steps may also be performed in a different order than those described herein.

At "Step 1," controller device 112 may receive a request from client device 110(2). In this example, controller device 112 may include a collaborative load balancer. For instance, the collaborative load balancer may apply dynamic traffic engineering concepts within environment 100. The request sent by client device 110(2) to controller device 112 may be a request to establish a secure communication session between client device 110(2) and a device associated with service B. The client device 110(2) may request the secure communication session in order to send application traffic associated with service B, for instance. Note that the request from client device 110(2) may be passed directly or indirectly to controller device 112. For instance, the request from client device 110(2) may be passed to controller device 112 via router 108(2).

At "Step 2," in response to receiving the request, controller device 112 may send a communication to router 108(2). The communication may cause router 108(2) to establish the secure communication session between the client device 110(2) and a device in multi-cloud environment 102B, with service B. For example, router 108(2) may be viewed as a headend device establishing a connection between client device 110(2) and a server in cloud computing network 104B(1) via a tunnel. In this example, the server in cloud computing network 104B(1) may be viewed as a backend device, and cloud computing network 104B(1) may be viewed as a resource infrastructure supporting service B.

Continuing the scenario in FIG. 1B, at "Step 3," controller device 112 may receive telemetry data from router 108(2). For instance, the telemetry data may indicate a quality and/or other characteristic of performance of the secure communication session between the client device 110(2) and service B in cloud computing network 104B(1). In some examples, the quality and/or performance information may be historic, observed, and/or predicted. Stated another way, Step 3 may represent controller device 112 receiving performance information regarding the tunnel(s) and/or other network connection(s) between the client device 110(2) and the multi-cloud environment 102B. The performance information regarding the tunnel(s) and/or other network connection(s) may be related to a key performance indicator (KPI) of a service.

In some examples, the performance information may be viewed as pull traffic. In this example, pull traffic may be similar to bidirectional forwarding detection (BFD) echo at a tunnel transport level. However, rather than being gathered at an application layer, the pull traffic may be collected by generating a periodical light probing request. The periodical light probing request may be encapsulated from each secure tunnel local end with a destination to a service endpoint anycast internet protocol (IP) (e.g., http/https HEAD message), for instance. Pull traffic may include a measure of service roundtrip latency and/or liveness/health of the tunnel and/or other network connection, among other parameters. In some examples, the performance information may be viewed as push traffic. For instance, push traffic may correspond to real-time transport protocol (RTP) media streaming from a service end. Push traffic may include monitoring a sequence number(s) and/or timestamp(s) of RTP header for jitter, latency, loss, etc. Push traffic may help provide insight into quality of data traffic pushed from services via the tunnel.

At "Step 4," controller device 112 may receive additional telemetry data from a backend device in multi-cloud environment 102B. The additional telemetry data may indicate a quality and/or other characteristic of performance of the multi-cloud environment 102B supporting service B. In some examples, controller device 112 may more specifically receive additional telemetry data from a backend device in cloud computing network 104B(1), which may indicate quality and/or another characteristic of performance of the resource infrastructure providing service B. Additionally, controller device 112 may receive additional telemetry data from any of a variety of backend devices in multi-cloud environment 102B that may provide historic, observed, and/or predicted performance information regarding multi-cloud environment 102B. Stated another way, Step 4 may represent controller device 112 receiving performance information regarding the multi-cloud environment 102B, such as performance within the resource infrastructure of cloud computing network 104B(1). The performance information regarding the multi-cloud environment 102B may be related to a KPI of a service. The multi-cloud environment side performance information may include resource usage and/or load information from the multi-cloud environment side, such as numbers of sessions served by the service, percentage of sessions served by the service, etc. The multi-cloud environment side performance information may be streamed and/or exported directly or indirectly to the collaborative load balancer. For example, the multi-cloud environment side performance information may be periodically provided as feedback loop to the collaborative load balancer, an orchestrator, an SDN controller, etc. In this manner, the collaborative load balancer may be provided insight into resources of the tunnel remote end (multi-cloud environment side). The collaborative load balancer may therefore be better able to avoid overloading and/or services degradation, even at closer geographic affinity.

Continuing the scenario in FIG. 1C, at "Step 5," controller device 112 may analyze the performance information received in Step 3 and/or Step 4. Controller device 112 may compare the performance information with expected performance levels. For instance, expected performance levels may relate to a generic performance level and/or policy associated with a service. The expected performance levels may relate to a particular service level agreement (SLA) and/or quality of service (QoS) policy related to the network connections and/or to a service. Generally, the expected performance levels may relate to any of a wide variety of expected operational targets. In some examples, controller device 112 may determine that the analysis of the current and/or expected performance information indicates that the service is being provided and/or will continue to be provided at an acceptable performance level. In such a case, the controller device 112 may take no action concerning the routing of application traffic related to the service.

In some examples, controller device 112 may determine that some aspect of performance associated with the secure communication session is within a threshold amount from violating an expected performance level, such as an SLA or QoS policy. The aspect of performance may be related to tunnel or other network connection(s) between the client device 110(2) and the multi-cloud environment 102B, and/or may be related to the multi-cloud environment 102B, such as the resource infrastructure of cloud computing network 104B(1). In response to determining that performance is within the threshold amount from violating the expected performance level, at "Step 6" of FIG. 1C, the controller device 112 may send a communication to router 108(2). The communication may cause router 108(2) to migrate the secure communication session between the client device 110(2) and service B to another resource that is capable of providing service B. For example, the secure communication session may be migrated from cloud computing network 104B(1) to cloud computing network 104B(2). In this example, the secure communication session may be routed over a different tunnel to a server within cloud computing network 104B(2), continuing to provide service B to client device 110(2). Stated another way, the secure communication session may be migrated from the first server in the first resource infrastructure to a second server in a second resource infrastructure that supports service B. Note that additional actions by controller 112 in response to determining that some aspect of performance associated with the secure communication session is within a threshold amount from violating an expected performance level are contemplated. For instance, the controller could send a communication to a variety of devices in environment 100 to alert the device(s) to the potential performance issue, with or without communicating instructions to router 108(2) to migrate the secure communication session.

To summarize, the scenario described above relative to FIGS. 1A-1C provides examples of how a collaborative load balancer may apply dynamic traffic engineering concepts to application traffic in a multi-cloud and/or hybrid cloud environment. The application traffic may be related to a service provided via a multi-cloud (and/or hybrid cloud) environment, via various tunnels and/or other network connections, to a client device. The dynamic traffic engineering concepts may include considering any factors that might affect KPIs of a service. The factors affecting a KPI may be related to the various tunnels and/or other network connections (e.g., network side), and/or may be related to the multi-cloud environment (e.g., multi-cloud environment side). As such, the collaborative load balancer may be able to improve network operations through more efficient load balancing and/or prediction of service issues.

The following discussion provides additional examples of performance information that may be considered by a collaborative load balancer. For instance, the following material may include considerations of the collaborative load balancer in the example analysis represented by Step 5 of FIG. 1C. The considerations may be used by the collaborative load balancer to implement dynamic traffic engineering concepts, such as tunnel selection for application traffic. The considerations may be used by the collaborative load balancer for tunnel selection for a new instance of application traffic, or for tunnel selection for an instance of migrating existing application traffic.

Figure 2:
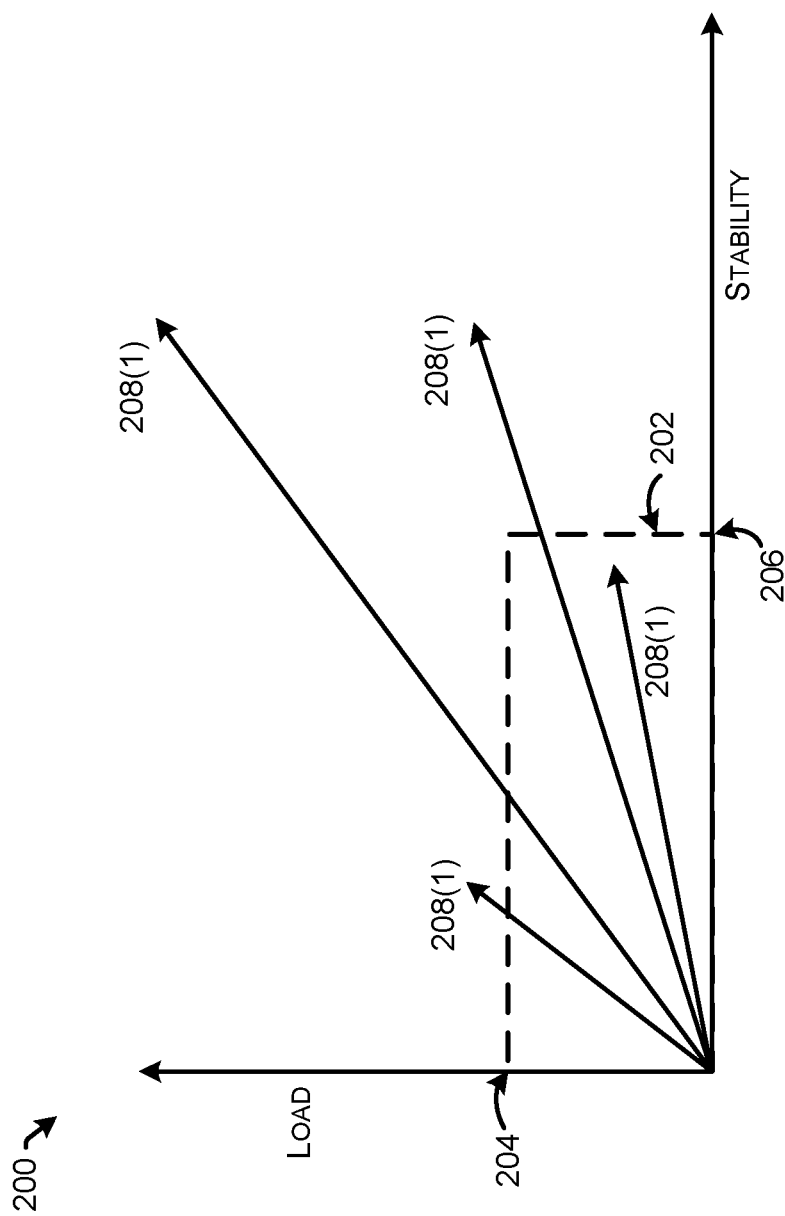
FIG. 2 illustrates an example graph of dynamic traffic engineering concepts that may be utilized by a collaborative traffic balancer, in accordance with the present concepts.

In some implementations, dynamic traffic engineering concepts may include selecting a tunnel based on both load capacity of the tunnel and stability of the tunnel. FIG. 2 illustrates an example graph 200 in accordance with the present dynamic traffic engineering concepts. Graph 200 may depict an example of the relationships between load capacity and stability. Graph 200 includes an "x-axis" representing load capacity of a tunnel, and a "y-axis" representing stability of the tunnel. Graph 200 also includes box 202 described by a line that intersects the y-axis at 204, and a line that intersects the x-axis at 206. Graph 200 also includes vectors 208.

In some implementations, graph 200 may represent how a collaborative traffic balancer may perform tunnel selection. For instance, a collaborative traffic balancer may need to select a tunnel for application traffic. The load capacity represented by the x-axis may indicate a load capacity (e.g., bandwidth) of a tunnel that would remain after placement of the application traffic with that particular tunnel. Stated another way, load capacity of traffic growth may be used by a collaborative traffic balancer to quantize and/or control a load of each tunnel. The load-factor may also be used to avoid overload of a tunnel, even where the tunnel in question offers better performance. The load-factor may also be used to determine tunnel sharing, where qualified, lighter-loaded tunnels may share loads. The stability represented by the y-axis may indicate a relative stability (e.g., lead-time to degradation) of the tunnel after placement of the application traffic with that particular tunnel. Stated another way, lead-time to degradation of an application may be used by a collaborative traffic balancer to quantize stability of a tunnel and time to serve a highest SLA class that the tunnel is qualified to serve. Furthermore, the stability may be weighted by a policy-based ratio of stability to load, in some examples. The vectors 204-210 may represent individual tunnels. For instance, vector 206 may represent a tunnel with relatively greater stability and greater load capacity than vector 204, after hypothetical placement of the application traffic with the respective tunnels.

In graph 200, box 202 may represent one or more thresholds, comprising both a threshold load capacity and a threshold stability at which application traffic will be placed with a particular tunnel. In some examples, the line that intersects the y-axis at 204 may represent a mean load capacity in a pool of tunnels. The line that intersects the x-axis at 206 may represent a minimum application hold-time on a tunnel, which may be weighted by a policy-based ratio of stability to load. Stated another way, a collaborative traffic balancer may not select a tunnel that corresponds to a vector that does not extend beyond (e.g., outside) box 202. In the example shown in FIG. 2, vector 210 does not extend beyond box 202. Note that vector 210 shows greater stability (e.g., extends further along the x-axis) than vector 204. However, vector 204 shows greater load capacity, therefore since vector 204 extends outside box 202, vector 204 may correspond to a tunnel that is selected over a tunnel corresponding to vector 210.

In some examples, mathematical relationships between the load capacity and stability of a tunnel may be represented with the following equations. A load capacity (e.g., load factor) L for a tunnel x may be described as:

$$\frac{R_x}{\sum_{i=1}^{m} R_i}$$

where R represents the resources (e.g., flows count, bandwidth, etc.) placed on the tunnel and m is a number of tunnels in a pool.

A stability (e.g., lead-time to degradation) S for the tunnel x may be described as:

$$\frac{D_x}{\sum_{i=1}^{m} D_i}$$

where D represents a preferred distance of the tunnel x, which is:

$$\sqrt{(\alpha S_x)^2 + L_x^2}$$

where $\alpha$ is a policy-based weight ratio of stability to load.

Referring to FIG. 2, the vectors 208 in graph 200 may be drawn with $L_x$, $S_x$, and $D_x$ found above, where the distance of a tunnel equates to a length of the vector 208. In some examples, selection of a tunnel for application traffic may be made with a placement preference factor for a tunnel x calculated from:

$$\frac{D_x - \overline{D}}{\sum_{i=1}^{m} \text{abs}(D_i - \overline{D})}$$

where $\overline{D}$ is a mean of $D_i$ in the pool of tunnels, and where $D_i < \overline{D}$. Stated another way, preference of a tunnel may be based on vector length (distance), which may be a linear combination of remaining load capacity of tunnel after placement of application traffic and stability of the tunnel among candidate tunnels. Additionally, preference of a tunnel may be influenced by the representative vector extending outside of threshold criteria related to the mean load capacity of the tunnel pool and/or stability of the tunnel. Furthermore, the stability threshold may be weighted by a policy-based ratio of stability to load. Preference of a tunnel may include a preference for a longer distance of the representative vector. Finally, preference of a tunnel may take into consideration a prediction of future conditions, such as a prediction of future load capacity of a tunnel.

In some examples, crowdsourcing, grouping, and/or peer comparison may be used to collect information regarding tunnel loading and/or routing within the multi-cloud environment. For example, data (e.g., roundtrip information) may be collected among similar anycast service requests and/or sessions. The data may be exported and/or shared, such as in data warehouse. The data may then be analyzed, correlated, compared, etc. to inform traffic engineering decisions. Crowdsourced updates and/or peer comparison may provide insight into how tunnels are loaded. Crowdsourcing and/or peer comparison may inform flow placement. For instance, crowdsourcing and/or peer comparison may inform steering anycast flow via tunnels that are less loaded, and/or away from tunnels that are (or are becoming) overloaded. Crowdsourcing and/or peer comparison may also help serve specific service and application traffic with specialized needs (type of network connection, etc.). Similarly, a collaborative load balancer may route application traffic toward different regions and/or different resource infrastructures within a multi-cloud environment based on crowdsourcing and/or peer comparison.

Crowdsourcing and/or peer comparison may provide prediction capabilities to a collaborative load balancer. A collaborative load balancer may learn patterns from crowdsourcing and/or peer comparison that can enable prediction of a potential upcoming disruption to service and/or degradation in service quality. For instance, the collaborative load balancer may learn that traffic loading increases at a certain time of day, certain day of the week, etc. A disruption to service may include a brownout scenario in which no proper tunnels from a client device to a service will be able to satisfy an SLA or QoS policy. A parameter such as application throughput (e.g., average throughput, maximum average throughput) exhibited or expected by an application may be used for tunnel selection. Tunnel selection based on such an application throughput parameter may be made before an application degrades. For instance, the collaborative traffic balancer may collect throughput information and through peer comparison, predict an upcoming performance issue. The collaborative traffic balancer may then take action to avoid degradation of the application. In response to a prediction of a potential upcoming disruption to service, the collaborative load balancer may raise a proactive warning that the service (e.g., application) may likely degrade. The collaborative load balancer may provide a suggestion to a client device and/or cause a client device to attempt direct access as an alternative. Similarly, a collaborative load balancer may predict service issues in different regions and/or different resource infrastructures within a multi-cloud environment and take appropriate action, such as alerting devices or rerouting traffic. In some examples, prediction capabilities may enable a collaborative load balancer to steer a new service session toward a tunnel in which SLAs of both the network side and the multi-cloud environment side are predicted to be satisfied.

In some implementations, dynamic traffic engineering concepts may be employed by a collaborative traffic balancer with the goal of approaching optimization for anycast services. Application traffic may flow via secure tunnels across multiple data center regions over time. A goal of approaching optimization for an anycast service may be to (potentially) fully utilize qualified tunnels evenly in a closest (most conveniently located) region, without overloading a backend service. The present dynamic traffic engineering concepts may represent an easy-to-implement balanced load-sharing. For instance, the collaborative traffic balancer may implement a round robin (RR) application traffic pattern among qualified tunnels that feature less load and longer stability. In some examples, "qualified" tunnels may refer to tunnels that offer an appropriate speed, bandwidth, etc. for a type of the application traffic. For instance, some tunnels may not be qualified to deliver voice data. In some examples, application traffic may be graded from higher class to lower class in this order: voice and/or real-time data, video/streaming data, control and/or OAM data, bulk data, and finally "catchall" data, which may also be described as last resort or scavenger data.

Dynamic traffic engineering concepts may include fulfilling routing requests for higher class application traffic as a preference over relatively lower class application traffic to share a new application traffic load or for migration of application traffic. Available tunnels may be viewed as belonging to a pool of tunnel options for satisfying applications. In some examples, tunnels within a pool may belong to a class of data, forming pools of relatively higher class and relatively lower class capabilities. A collaborative traffic balancer may seek to satisfy application SLAs while also balancing load across several applications requesting access to the pool of tunnels. A collaborative traffic balancer may aim to under-load the pool of tunnels after placement of the requested application data while maintaining stability across the pool.

In some examples, a tunnel may degrade to a lower class. A collaborative traffic balancer may use a degraded tunnel to join in any data classes it may satisfy, based on load-factor and stability. Also, a new tunnel may join a pool based on the highest data class it can satisfy. Dynamic traffic engineering concepts may also include a practice termed "soaking," in which data traffic is held for some time. For instance, data traffic may be held when moving across a boundary to avoid frequent churn, especially in regards to a tunnel with relatively lower stability.

In some examples, a collaborative traffic balancer may choose to fill in higher class traffic before lower class traffic, even under an unpredicted massive tunnel churn, where a tunnel remains underloaded, with good stability. In some implementations, a collaborative traffic balancer may determine tunnel preference based on an amplitude of a linear combination of lead-time to degrade (e.g., stability) and capacity of traffic growth (e.g., load factor). The collaborative traffic balancer may aim to balance stability and load factor to minimize churn and/or overload. Dynamic traffic engineering concepts may include a flexible policy of preference. For example, with a linear combination of factors such as lead-time to degrade and room for bandwidth growth, a weight ratio of each factor may be controlled as a parameter of a preference policy.

In some examples, dynamic traffic engineering concepts may include elements of operator control. A collaborative traffic balancer may be able to receive input from an operator to force a route for application traffic, to save a particular tunnel for particular application traffic, etc. For instance, an operator may be able to intentionally "pin" a tunnel to a lower data class. A tunnel pinned in this manner may be prevented from joining an available pool of tunnels for higher class data. A pinned tunnel may be flagged as having a fixed high load-factor, a short lead-time to degrade, etc. Operator control may be viewed as policy and/or heuristic inputs to traffic engineering.

Additionally or alternatively, in some examples, tunnels may be selected with consideration for security concerns, such as choosing a secure tunnel. In other examples, tunnels may be selected in view of a service KPI as the KPI relates to the tunnel. The application traffic may be routed with the intent of satisfying SLAs related to network services and/or multi-cloud services. The application traffic may be routed without overloading traffic on qualified tunnels. Paths over more capable, higher performing tunnels and/or backend service endpoints may be given a volunteer chance to help out and share an application traffic load.

To summarize, the dynamic traffic engineering concepts and techniques described herein may improve network performance by significantly improving the efficiency of application traffic flow. By considering both network and backend operations for tunnel selection, the techniques may improve operational efficiency across an entire multi-cloud environment. Furthermore, prediction of service issues, and proactive migration of application traffic to less-impacted tunnels may prevent significant network problems, such as loss of service. The techniques may be relatively lightweight, featuring low computational cost and/or low bandwidth usage. Furthermore, the benefits of dynamic traffic engineering concepts may be enjoyed while meeting both network and cloud SLAs and/or QoS policies.

Figure 3:
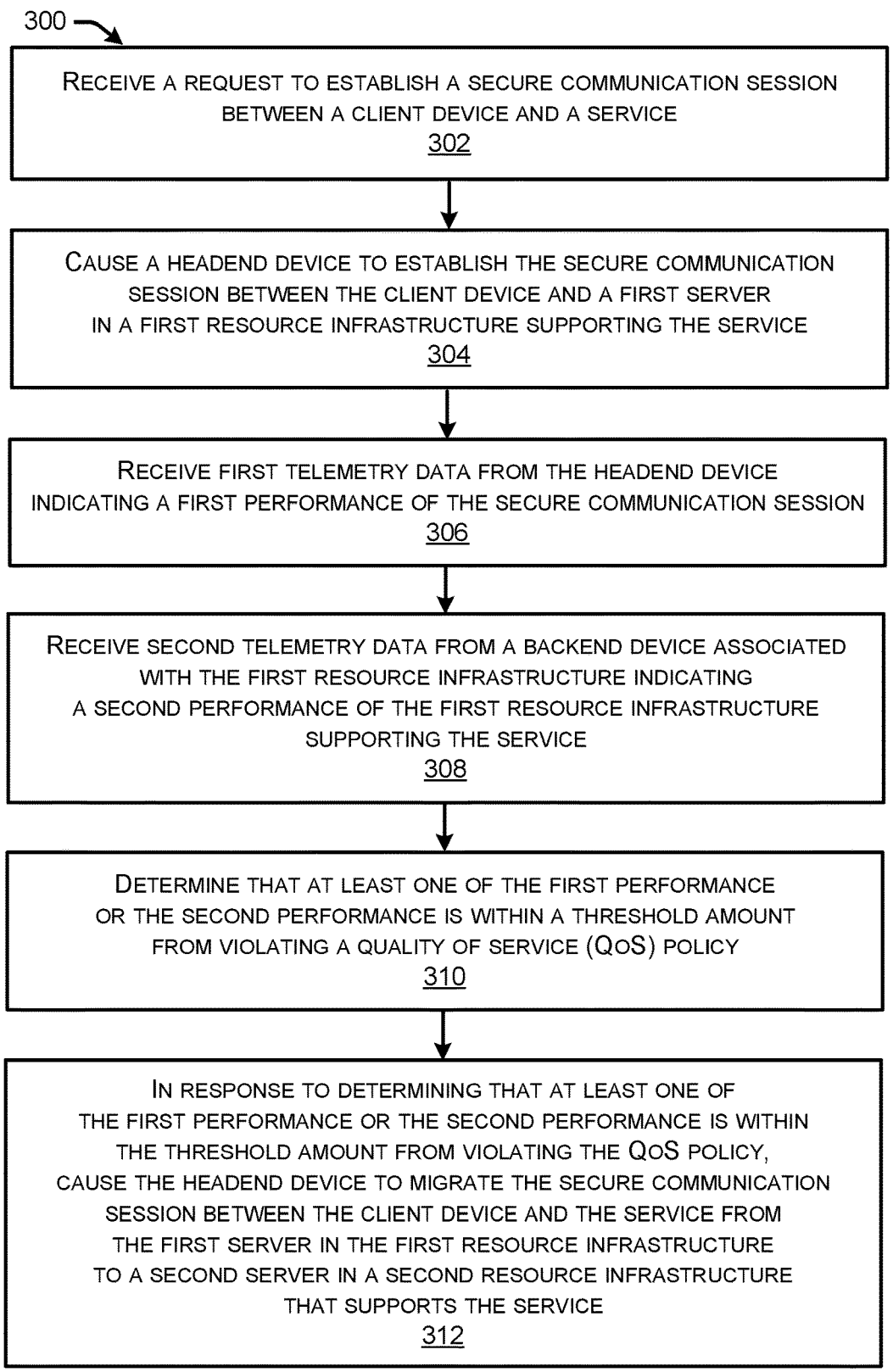
FIGS. 3-4 illustrate flow diagrams of example methods that may be implemented by a collaborative traffic balancer in relation to communications among network devices, in accordance with the present concepts.
Figure 4:
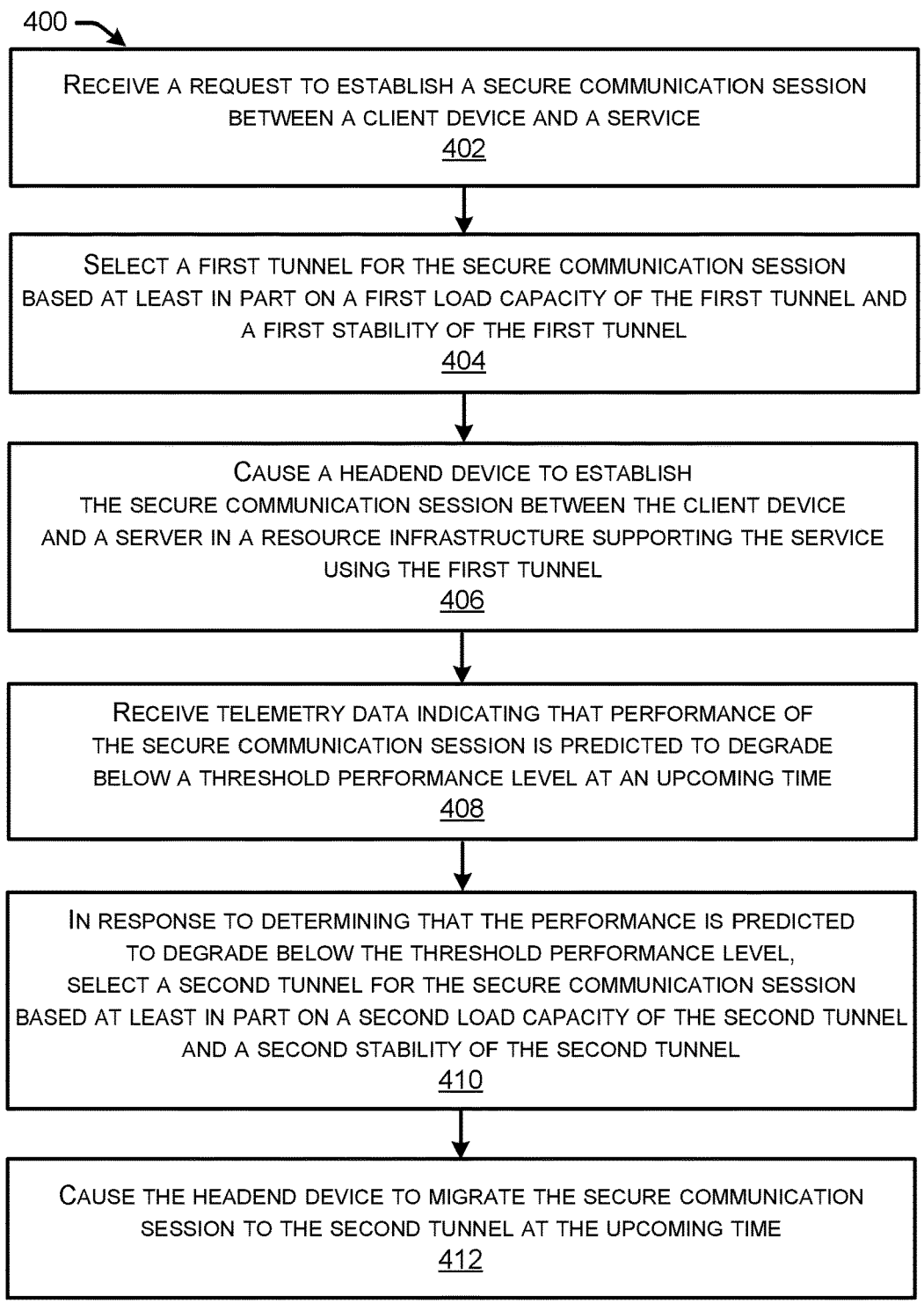

FIGS. 3 and 4 illustrate flow diagrams of example methods 300-500 that include functions that may be performed at least partly by a client device, router, control device, server, and other device described relative to FIGS. 1A-1C. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 3 and 4 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 3 illustrates a flow diagram of an example method 300 for one or more network devices to dynamic traffic engineering concepts. Method 300 may be performed by a control device and/or a collaborative traffic balancer (e.g., controller device 112) communicatively coupled to one or more other network devices, for instance. In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include receiving a request to establish a secure communication session between a client device and a service. The service may be SaaS, for instance.

At 304, method 300 may include causing a headend device to establish the secure communication session between the client device and a first server in a first resource infrastructure supporting the service. The first resource infrastructure may be a multi-cloud environment and/or a hybrid cloud environment, for instance. The secure communication session may be established at least in part over a tunnel (e.g., WAN tunnel) between the headend device and the first resource infrastructure.

At 306, method 300 may include receiving first telemetry data from the headend device indicating a first performance of the secure communication session. The method may include sending a probe to the headend device; and receiving the first telemetry data in response to the probe.

At 308, method 300 may include receiving second telemetry data from a backend device associated with the first resource infrastructure indicating a second performance of the first resource infrastructure supporting the service. The method may include sending a probe to the first resource infrastructure; and receiving the second telemetry data in response to the probe. The second telemetry data may correspond to latency associated with the secure communication session, such as roundtrip latency from the first resource infrastructure to the headend device, roundtrip latency from the first resource infrastructure to the client device, etc. The second telemetry data may correspond to any of a variety of parameters, such as stability, bandwidth, jitter, etc.

At 310, method 300 may include determining that at least one of the first performance or the second performance is within a threshold amount from violating a quality of service (QoS) policy. The QoS policy may be related to the first resource infrastructure. For example, the QoS policy may be related to operation of the first resource infrastructure as it affects the service provided to the client device. In other examples, the QoS policy may be related to network connections and/or tunnels between the headend device and the first resource infrastructure, etc. For instance, the secure communication session between the client device and the first server in the first resource infrastructure may be established over a tunnel, and the QoS policy may be related to a performance parameter of the tunnel.

At 312, in response to determining that at least one of the first performance or the second performance is within the threshold amount from violating the QoS policy, method 300 may include causing the headend device to migrate the secure communication session between the client device and the service from the first server in the first resource infrastructure to a second server in a second resource infrastructure that supports the service. In some examples, method 300 may include selecting a tunnel associated with the second server in the second resource infrastructure, and causing the headend device to migrate the secure communication session to the tunnel that is selected. The tunnel may be selected based at least in part on load capacity of the tunnel and a stability of the tunnel, for instance. The load capacity of the tunnel may be estimated as the load capacity of the tunnel that would remain where the secure communication session is migrated to the tunnel.

FIG. 4 illustrates a flow diagram of an example method 400 for one or more network devices to dynamic traffic engineering concepts. Method 400 may be performed by a control device and/or a collaborative traffic balancer (e.g., controller device 112) communicatively coupled to one or more other network devices, for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include receiving a request to establish a secure communication session between a client device and a service.

At 404, method 400 may include selecting a first tunnel for the secure communication session based at least in part on a first load capacity of the first tunnel and a first stability of the first tunnel. The tunnel may be a WAN tunnel, for instance.

At 406, method 400 may include causing a headend device to establish the secure communication session between the client device and a server in a resource infrastructure supporting the service using the first tunnel.

At 408, method 400 may include receiving telemetry data indicating that performance of the secure communication session is predicted to degrade below a threshold performance level at an upcoming time. In some examples, the telemetry data may comprise historical data. Method 400 may include analyzing the historical data to determine that the performance of the secure communication session is predicted to degrade below the threshold performance level at the upcoming time. In some examples, the telemetry data may comprise crowdsourced data. Method 400 may include analyzing the crowdsourced data to determine that the performance of the secure communication session is predicted to degrade below the threshold performance level at the upcoming time. In some examples, the telemetry data comprise peer data. Method 400 may also include receiving observed data from the headend device, and comparing the peer data to the observed data to determine that the performance of the secure communication session is predicted to degrade below the threshold performance level at the upcoming time. The peer data and/or the observed data may relate to application throughput, for instance. In some implementations, the telemetry data may include historical data, crowdsourced data, peer data, and observed data, and method 400 may include analyzing any or all of these types or sources of data to determine a current and/or predicted performance level. The historical data, crowdsourced data, peer data, and/or observed data may relate to the service being provided, similar services, the tunnel(s) and/or other network connections, the multi-cloud environment(s), etc.

At 410, in response to determining that the performance is predicted to degrade below the threshold performance level, method 400 may include selecting a second tunnel for the secure communication session based at least in part on a second load capacity of the second tunnel and a second stability of the second tunnel.

At 412, method 400 may include causing the headend device to migrate the secure communication session to the second tunnel before the upcoming time. For instance, method 400 may include causing the headend device to migrate the secure communication session before the upcoming time. In some examples, in response to determining that the performance is predicted to degrade below the threshold performance level, method 400 may include sending a message to the client device regarding the secure communication session. The message may indicate that the performance is predicted to degrade. In some examples, the message may include a suggestion and/or instructions to change to a different type of connection to continue accessing the service.

Figure 5:
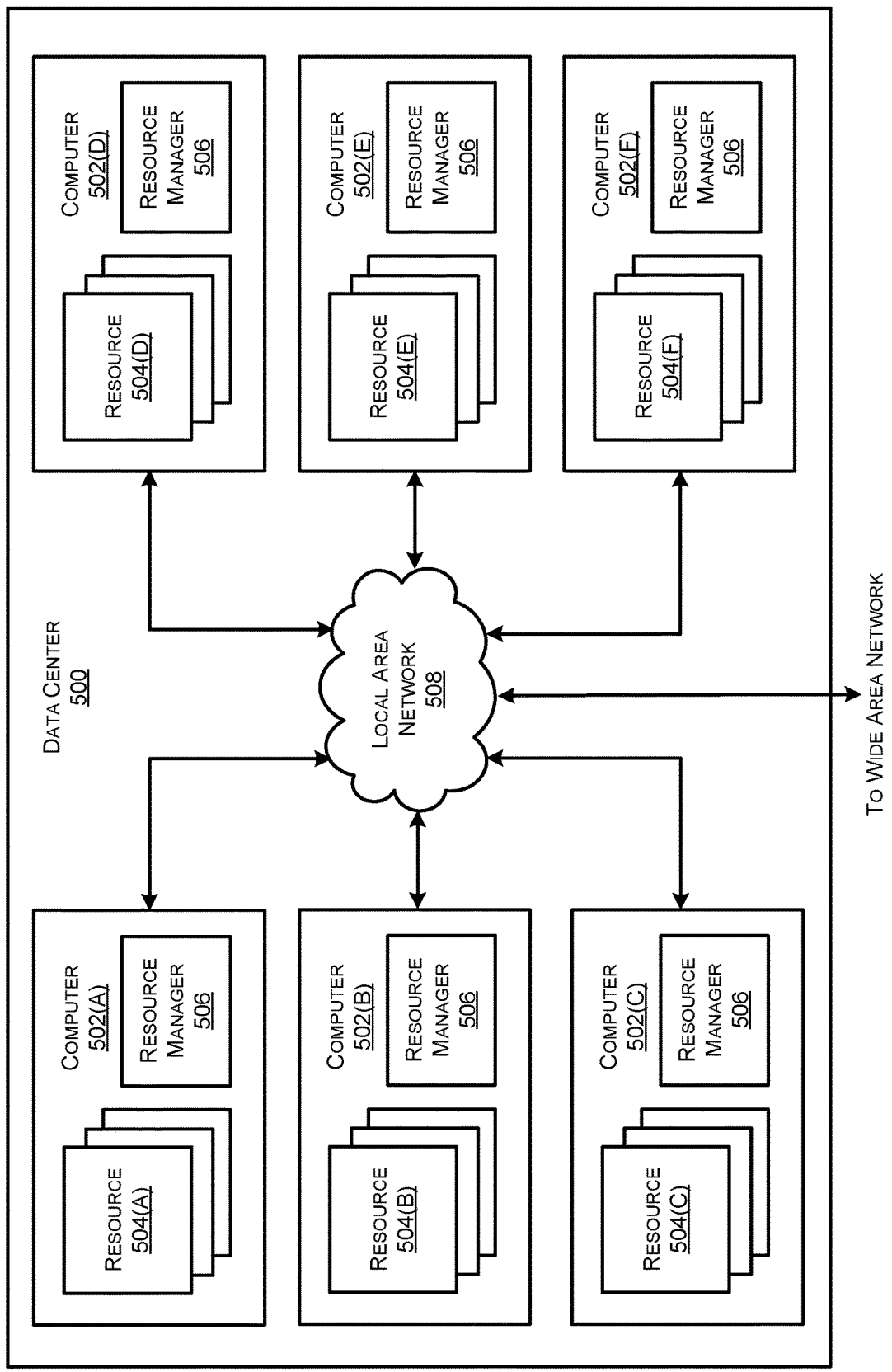
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several computers 502A-502F (which might be referred to herein singularly as "a computer 502" or in the plural as "the computers 502") for providing computing resources. In some examples, the resources and/or computers 502 may include, or correspond to, any type of networked device described herein, such as controller device 112. Although computers 502 may comprise any type of networked device, such as servers, switches, routers, hubs, bridges, gateways, modems, repeaters, access points, hosts, etc.

The computers 502 can be standard tower, rack-mount, or blade server computers configured appropriately for providing computing resources. In some examples, the computers 502 may provide computing resources 504 including data processing resources such as virtual machine (VM) instances or hardware computing systems, database clusters, computing clusters, storage clusters, data storage resources, database resources, networking resources, and others. Some of the computers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single computer 502. Computers 502 in the data center 500 can also be configured to provide network services and other types of services.

In the example data center 500 shown in FIG. 5, an appropriate local area network (LAN) 508 is also utilized to interconnect the computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the computers 502A-502F in each data center 500, and, potentially, between computing resources in each of the computers 502. It should be appreciated that the configuration of the data center 500 described with reference to FIG. 5 is merely illustrative and that other implementations can be utilized.

In some examples, the computers 502 may each execute one or more application containers and/or virtual machines to perform techniques described herein. For instance, the containers and/or virtual machines may serve as controller devices, server devices, user/client devices, and/or routers in environment 100, and/or within any of the multi-cloud environments 102 depicted in environment 100.

In some instances, the data center 500 may provide computing resources, like application containers, VM instances, and storage, on a permanent or an as-needed basis. Among other types of functionality, the computing resources provided by a cloud computing, multi-cloud computing, and/or hybrid cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regards to FIG. 6.

Figure 6:
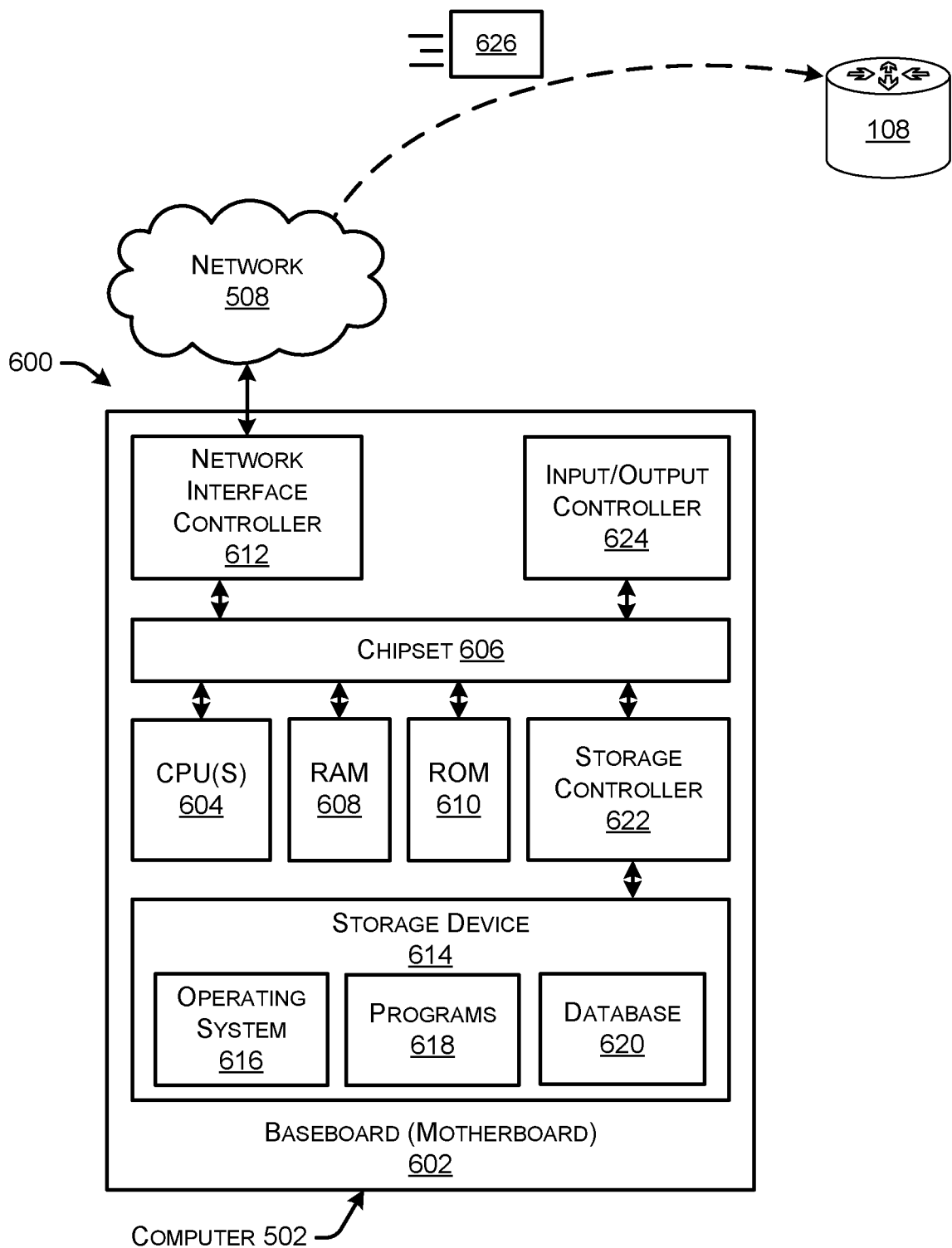
FIG. 6 is a computer architecture diagram showing an illustrative computer hardware architecture for implementing a device that can be utilized to implement aspects of the various technologies presented herein.

FIG. 6 shows an example computer architecture 600 for a computer 502 capable of executing program components for implementing the functionality described above. The computer architecture 600 shown in FIG. 6 illustrates a conventional server computer, workstation, desktop computer, laptop, tablet, network appliance, e-reader, smartphone, and/or other computing device, and can be utilized to execute any of the software components presented herein. The computer 502 may, in some examples, correspond to a physical device described herein (e.g., controller device, server, client device, router, etc.), and may comprise networked devices such as servers, switches, routers, hubs, bridges, gateways, modems, repeaters, access points, etc. For instance, computer 502 may correspond to controller device 112.

As shown in FIG. 6, the computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 502 can operate in a networked environment using logical connections to remote computing devices and computer systems through a network, such as the network 508. The chipset 606 can include functionality for providing network connectivity through a network interface controller (NIC) 612, such as a gigabit Ethernet adapter. The NIC 612 is capable of connecting the computer 502 to other computing devices over the network 508. For instance, in the example shown in FIG. 6, NIC 612 may help facilitate transfer of data, packets, and/or communications, such as requests and/or instructions, over the network 508, such as to a router 108. It should be appreciated that multiple NICs 612 can be present in the computer 502, connecting the computer to other types of networks and remote computer systems.

The computer 502 can be connected to a storage device 614 that provides non-volatile storage for the computer. The storage device 614 can store an operating system 616, programs 618, a database 620, and/or other data. The storage device 614 can be connected to the computer 502 through a storage controller 622 connected to the chipset 606, for example. The storage device 614 can consist of one or more physical storage units. The storage controller 622 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 614 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 614 is characterized as primary or secondary storage, and the like.

For example, the computer 502 can store information to the storage device 614 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 614 by detecting the physical states or characteristics of one or more particular locations within the physical storage units.

In addition to the mass storage device 614 described above, the computer 502 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 502. In some examples, the operations performed by the network 508, and or any components included therein, may be supported by one or more devices similar to computer 502. Stated otherwise, some or all of the operations performed by the network 508, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 614 can store an operating system 616 utilized to control the operation of the computer 502. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 614 can store other system or application programs and data utilized by the computer 502.

In one embodiment, the storage device 614 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 502 has access to computer-readable storage media storing computer-executable instructions which, when executed by the computer 502, perform the various processes described above with regards to FIGS. 1A-4. The computer 502 can also include computer-readable storage media having instructions stored thereupon for performing any of the other computer-implemented operations described herein.

The computer 502 can also include one or more input/output controllers 624 for receiving and processing input from a number of input devices, such as a keyboard, a mouse, a touchpad, a touch screen, an electronic stylus, or other type of input device. Similarly, an input/output controller 624 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

As described herein, the computer 502 may comprise one or more devices, such as controller device 112, routers 108, devices within multi-cloud environments 102, and/or other devices. The computer 502 may include one or more hardware processors 604 (processors) configured to execute one or more stored instructions. The processor(s) 604 may comprise one or more cores. Further, the computer 502 may include one or more network interfaces configured to provide communications between the computer 502 and other devices, such as the communications described herein as being performed by controller device 112 and client devices 110, routers 108, and/or other devices. In some examples, the communications may include instructions 626, data, packets, requests, acknowledgments, messages, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 618 may comprise any type of programs or processes to perform the techniques described in this disclosure in accordance with dynamic traffic engineering techniques. For instance, the programs 618 may cause the computer 502 to perform techniques for communicating with other devices using any type of protocol or standard usable for determining connectivity. Additionally, the programs 618 may comprise instructions that cause the computer 502 to perform the specific techniques for the employment of a collaborative traffic balancer.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
   receiving a request to establish a secure communication session between a client device and a service;
   causing a headend device to establish the secure communication session between the client device and a first server in a first cloud computing infrastructure supporting the service;
   receiving first telemetry data from the headend device indicating a first performance metric associated with the secure communication session between the client device and the first server;
   receiving second telemetry data from a backend device associated with the first cloud computing infrastructure indicating a second performance metric that comprises load information from within the first cloud computing infrastructure supporting the service;
   determining that at least one of the first performance metric or the second performance metric is within a threshold amount from violating a quality of service (QoS) policy; and
   in response to determining that at least one of the first performance metric or the second performance metric is within the threshold amount from violating the QoS policy, causing the headend device to migrate the secure communication session between the client device and the service from the first server in the first cloud computing infrastructure to a second server in a second cloud computing infrastructure that supports the service.

2. The method of claim 1, further comprising:
   selecting a tunnel associated with the second server in the second cloud computing infrastructure; and
   causing the headend device to migrate the secure communication session to the tunnel.

3. The method of claim 2, further comprising:
   selecting the tunnel based at least in part on load capacity of the tunnel and a stability of the tunnel.

4. The method of claim 3, further comprising:
   determining the load capacity of the tunnel by estimating the load capacity of the tunnel that would remain where the secure communication session is migrated to the tunnel.

5. The method of claim 1, further comprising:
   sending a probe to the first cloud computing infrastructure; and
   receiving the second telemetry data in response to the probe.

6. The method of claim 1, wherein the first telemetry data correspond to roundtrip latency from the first cloud computing infrastructure to the headend device.

7. The method of claim 1, wherein the second performance metric is within the threshold amount from violating the QoS policy and the QoS policy is related to numbers of sessions served by the service.

8. A controller device comprising:
   one or more processors; and
   one or more non-transitory computer-readable media storing computer-executable instructions that, when executed by the one or more processors, cause the one or more processors to:
   receive, at the controller device and from a headend device, a request to establish a secure communication session between a client device and a service;
   cause the headend device to establish the secure communication session between the client device and a first server in a first cloud computing infrastructure supporting the service;
   receive telemetry data from a backend device associated with the first cloud computing infrastructure, the telemetry data associated with a performance metric of the first cloud computing infrastructure supporting the service, the telemetry data including load information of the service;
   determine that the performance metric is within a threshold amount from violating a quality of service (QoS) policy; and
   based at least in part on the performance metric being within the threshold amount, cause the headend device to migrate the secure communication session between the client device and the service from the first server in the first cloud computing infrastructure to a second server in a second cloud computing infrastructure that supports the service.

9. The controller device of claim 8, wherein the computer-executable instructions further cause the one or more processors to:
   select a tunnel associated with the second server in the second cloud computing infrastructure; and
   cause the headend device to migrate the secure communication session to the tunnel.

10. The controller device of claim 9, wherein the computer-executable instructions further cause the one or more processors to:

select the tunnel based at least in part on load capacity of the tunnel and a stability of the tunnel.

11. The controller device of claim 10, wherein the computer-executable instructions further cause the one or more processors to:
determine the load capacity of the tunnel by estimating the load capacity of the tunnel that would remain where the secure communication session is migrated to the tunnel.

12. The controller device of claim 8, wherein the computer-executable instructions further cause the one or more processors to:
send a probe to the first cloud computing infrastructure; and
receive the telemetry data in response to the probe.

13. The controller device of claim 8, wherein the load information includes numbers of sessions served by the service via the first cloud computing infrastructure.

14. The controller device of claim 8, wherein the QoS policy is related to the first cloud computing infrastructure.

15. A method comprising:
receiving a request to establish a secure communication session between a client device and a service;
selecting a first tunnel for the secure communication session based at least in part on a first load capacity of the first tunnel and a first stability of the first tunnel;
causing a headend device to establish the secure communication session between the client device and a server in a first cloud computing infrastructure supporting the service using the first tunnel;
receiving telemetry data indicating that performance of the secure communication session is predicted to degrade below a threshold performance level at an upcoming time; and
in response to determining that the performance is predicted to degrade below the threshold performance level, automatically:
selecting a second tunnel for the secure communication session based at least in part on a second load capacity of the second tunnel and a second stability of the second tunnel, the second tunnel connecting the headend device to a second server in a second cloud computing infrastructure supporting the service; and
causing the headend device to migrate the secure communication session to the second tunnel before the upcoming time.

16. The method of claim 15, wherein the telemetry data comprise historical data, the method further comprising:
analyzing the historical data to determine that the performance of the secure communication session is predicted to degrade below the threshold performance level at the upcoming time.

17. The method of claim 15, wherein the telemetry data comprise crowdsourced data, the method further comprising:
analyzing the crowdsourced data to determine that the performance of the secure communication session is predicted to degrade below the threshold performance level at the upcoming time.

18. The method of claim 15, wherein the telemetry data comprise peer data, the method further comprising:
receiving observed data from the headend device; and
comparing the peer data to the observed data to determine that the performance of the secure communication session is predicted to degrade below the threshold performance level at the upcoming time.

19. The method of claim 18, wherein the peer data and the observed data relate to application throughput.

20. The method of claim 15, further comprising:
in response to determining that the performance is predicted to degrade below the threshold performance level, sending a message to the client device regarding the secure communication session.

* * * * *